(12) United States Patent
Shen et al.

(10) Patent No.: US 9,247,127 B2
(45) Date of Patent: Jan. 26, 2016

(54) FAST FOCUSING METHOD AND DEVICE FOR MULTI-SPECTRAL IMAGING

(71) Applicant: The Hong Kong Research Institute of Textiles and Apparel Limited, Hong Kong (HK)

(72) Inventors: Huiliang Shen, Hong Kong (CN); Wei Wang, Hong Kong (CN); Zhi-Huan Zheng, Hong Kong (CN); John Haozhong Xin, Hong Kong (GB); Sijie Shao, Hong Kong (CN)

(73) Assignee: THE HONG KONG RESEARCH INSTITUTE OF TEXTILES AND APPAREL LIMITED, Hong Kong (HK)

( * ) Notice: Subject to any disclaimer, the term of this patent is extended or adjusted under 35 U.S.C. 154(b) by 99 days.

(21) Appl. No.: 14/291,026

(22) Filed: May 30, 2014

(65) Prior Publication Data

US 2015/0092099 A1   Apr. 2, 2015

(30) Foreign Application Priority Data

Sep. 30, 2013   (CN) .......................... 2013 1 0464106

(51) Int. Cl.
| | |
|---|---|
| G01J 3/28 | (2006.01) |
| G01J 3/32 | (2006.01) |
| H04N 5/232 | (2006.01) |
| G01J 3/02 | (2006.01) |
| G01J 3/51 | (2006.01) |
| G02B 7/38 | (2006.01) |

(52) U.S. Cl.
CPC .......... *H04N 5/23212* (2013.01); *G01J 3/0202* (2013.01); *G01J 3/027* (2013.01); *G01J 3/0208* (2013.01); *G01J 3/0235* (2013.01); *G01J 3/0237* (2013.01); *G01J 3/0294* (2013.01); *G01J 3/28* (2013.01); *G01J 3/2823* (2013.01); *G01J 3/32* (2013.01); *G01J 3/51* (2013.01); *G02B 7/38* (2013.01); *G01J 2003/2826* (2013.01)

(58) Field of Classification Search
CPC .... H04N 5/23212; G01J 3/0294; G01J 3/027; G01J 3/0237; G01J 3/2823; G01J 2003/2826; G01J 3/32
USPC .......... 348/345, 349, 372, 373, 360, 379, 270
See application file for complete search history.

(56) References Cited

U.S. PATENT DOCUMENTS

| | | | | |
|---|---|---|---|---|
| 5,046,162 | A * | 9/1991 | Ishikawa | G02B 5/20 348/270 |
| 2003/0193564 | A1* | 10/2003 | Jenkins | H04N 17/04 348/182 |
| 2005/0251019 | A1* | 11/2005 | Urabe | H04N 9/093 600/407 |
| 2010/0245657 | A1* | 9/2010 | Adachi | G03B 13/36 348/349 |
| 2013/0027791 | A1* | 1/2013 | Asano | G02B 7/102 359/824 |

* cited by examiner

*Primary Examiner* — Nhan T Tran
*Assistant Examiner* — Chan Nguyen

(57) ABSTRACT

Fast focusing methods and devices for multi-spectral imaging are disclosed. The method comprising selecting one of a plurality of imaging channel as a reference channel, adjusting rotation positions of a stepper motor, calculating focus measures corresponding to all rotation positions of the stepper motor, and obtaining a first distribution curve; in each of the other imaging channels, selecting at least three rotation positions of the stepper motor, matching focus measures at the selected rotation positions with the first distribution curve to obtain a second distribution curve and a offset value between the first distribution curve and the second distribution curve, and calculating a clear focusing position of the imaging channel to be focused according to the offset value; performing a fine-tuning focusing, and thereby obtaining a more precise clear focusing position. A fast focusing for multi-spectral imaging and obtain clear multi-spectral images is obtained.

8 Claims, 3 Drawing Sheets

Selecting a reference channel, and finding the clearest focusing position of the reference channel by coarse-tuning and fine-tuning focusing Calculating focus measures corresponding to all rotation positions of a stepper motor in the reference channel by an interpolation method, and obtaining a distribution curve representing the change of the focus measure along with the rotation position of the stepper motor For each of the other channels, selecting at least three positions, calculating focus measures at the selected positions, and matching the focus measures at the selected rotation positions with the distribution curve Calculating an offset value between a distribution curve representing the change of the focus measure of the channel to be focused along with the rotation position of the stepper motor and the distribution curve representing the change of the focus measure of the reference channel along with the rotation position of the stepper motor Performing a fine-tuning focusing operation in a preset range near a calculated clear focusing position of the channel requiring being focused, and obtaining a precise clear focusing position

FAST FOCUSING METHOD AND DEVICE FOR MULTI-SPECTRAL IMAGING

CROSS REFERENCE TO RELATED APPLICATION

The present application claims the benefit of Chinese Patent Application No. 201310464106.2 filed on Sep. 30, 2013; the contents of which are hereby incorporated by reference.

FIELD OF THE INVENTION

The present application relates to focusing methods and focusing devices, and more particularly, relates to a fast focusing method and a fast focusing device for multi-spectral imaging.

BACKGROUND

Spectral analysis is an important research method in natural science. Spectroscopy technology can detect physical structures, chemical compositions, and other indicators of detected objects. Spectral analysis is based on point measurement, image measurement is based on changes of spatial characteristics, and each of the two methods has its own advantages and disadvantages. Therefore, it can be said that spectral imaging technology is an inevitable result caused by development of spectral analysis technology and image analysis technology, and is a product of a perfect combination of the two technologies. Spectral imaging technology has not only the spectral resolution function but also the spatial resolution function to distinguish the image position. By spectral imaging technology, not only qualitative and quantitative analysis of a detected object but also positioning analysis of the detected object can be performed.

Multi-spectral imaging technology integrates images and spectrums, and can not only obtain geometry information of an imaging target but also identify spectral characteristics difference of the imaged target. Spectral characteristics of targets, false targets, and backgrounds are different, and have different spectral brightness in different spectral channels. Multi-spectral imaging can enhance a contrast between a target and a background, and thus can effectively suppress background noise, distinguish true targets and false targets, and improve system target identification ability. Multi-spectral imaging technology has already been widely used in various fields, such as aeronautical and aerospace remote sensing, land resources survey, forest fire prevention, environmental monitoring, marine applications, agricultural yield estimation, and so on.

Multi-spectral imaging technology uses a group of optical filters to divide the visible spectrum into at least five spectral bands, and each of the spectral bands corresponds to one channel. A target object is imaged in these channels respectively, and monochrome images of all the channels are combined together to form a multi-spectral image. Therefore, this technology is also widely used in the fields of scene simulation, natural light spectrum restoration, and spectral color measurement, and so on.

Optical filters and imaging lenses used in multi-spectral imaging have different refractive indexes in different spectral bands, which results in differences between equivalent focal lengths for imaging in these spectral bands. Therefore, only if each of these spectral bands is focused independently, can clear multi-spectral images be formed.

Conventional focusing devices can be divided into two categories.

(1) Focusing devices use specific mechanical devices to drive stepper motors to adjust distances between different lenses or distances between lenses and camera photoelectric detectors, and thereby achieve the focusing function. This type of focusing devices is widely used in ordinary cameras.

(2) Focusing devices use specific mechanical devices to maintain distances between lenses and cameras and adjust distances between cameras and photographed objects, and thereby achieve the focusing function. This type of focusing devices is generally used in microscopes.

In multi-spectral imaging, focusing devices of the category (1) can be adopted. However, multi-spectral imaging has many spectral bands, and when each of the spectral bands is accurately focused, conventional focusing methods have low efficiency. Therefore, a fast focusing method and a corresponding focusing device for multi-spectral imaging need to be developed, so that multi-spectral focusing can be achieved efficiently and clear multi-spectral images can be obtained.

SUMMARY

Aiming at the defect in the conventional multi-spectral focusing technology of low efficiency resulted from precise focusing for each spectral band, a fast focusing method for multi-spectral imaging is provided.

One aspect of the present application provides a fast focusing method for multi-spectral imaging, which uses similarities of distribution curves that represent changing relations between focus measures of various spectral bands and rotation positions of a stepper motor to achieve a fast focusing for multi-spectral imaging and obtain clear spectral images. The method includes following steps:

S1, selecting one of a plurality of imaging channels as a reference channel, adjusting rotation positions of a stepper motor, calculating focus measures corresponding to all rotation positions of the stepper motor, and obtaining a first distribution curve that represents the change of the focus measure of the reference channel along with the rotation position of the stepper motor;

S2, for each of the other imaging channels, selecting at least three rotation positions of the stepper motor, matching focus measures at the selected rotation positions with the first distribution curve to obtain a second distribution curve that represents the change of the focus measure of the imaging channel to be focused along with the rotation position of the stepper motor and an offset value between the first distribution curve and the second distribution curve, and calculating a clear focusing position of the imaging channel to be focused according to the offset value;

S3, performing a fine-tuning focusing operation centering on the calculated clear focusing position by using a minimal rotation interval of the stepper motor, and thereby obtaining a precise clear focusing position.

In the present application, the first distribution curve is related to only the reference channel. Except the reference channel, there are many other channels, and each of the other channels can obtain a corresponding second distribution curve. Therefore, the second distribution curve refers to all distribution curves that represent the changes of focus measures of all of the channels except the reference channel along with the rotation position of the stepper motor.

According to the imaging requirement, spectrum is divided into a plurality of spectral bands by optical filters, and each of the spectral bands corresponds to one imaging channel. A target object is respectively imaged in each of the spectral bands (i.e., in each of the channels), and clear images formed in all of the channels are combined together to form a multi-spectral image.

Preferably, in the step S1, the focusing operation is performed by a strategy that combines a coarse-tuning focusing operation with a fine-tuning focusing operation. That is, the target object is imaged in a greater rotation interval of the stepper motor, and a focus measure is evaluated to obtain a coarse clear focusing position. Thus, a fine-tuning focusing operation using a minimal rotation interval of the stepper motor is performed near the coarse clear focusing position to obtain the clearest focusing position.

Preferably, in the step S1, the focus measures are calculated by a gray-level difference method.

Preferably, in the step S1, the first distribution curve that represents the change of the focus measure of the reference channel along with the rotation position of the stepper motor is obtained by an interpolation method. That is, focus measures corresponding to all rotation positions of the stepper motor in the reference channel are calculated by the interpolation method, and the first distribution curve is thereby obtained.

Preferably, in the step S2, the selected rotation positions of the stepper motor are distributed throughout a whole focusing range. The selected rotation positions of the stepper motor should not concentrate in a particular region of the focusing range, and should spread as uniformly as possible in the whole focusing range, so that matching error between the focus measures of the channels to be focused and the first distribution curve can be reduced.

Preferably, in the step S2, the error is defined as $$e = \sum_{j=1}^{N} |\eta f_c(k_i) - f_b(k_i + d)|^2.$$

When the error is the minimum thereof, an offset value d is calculated. Wherein, $f_c(k_i)$ represents the result of focus measure in the channel c at a certain rotation position $k_i$ of the stepper motor, $f_b(k_i+d)$ represents the result of focus measure in the reference channel at a rotation position $k_i+d$ of the stepper motor, and N represents the total number of the rotation positions of the stepper motor.

Preferably, in the step S3, the fine-tuning focusing operation is performed in a preset range centering on the calculated clear focusing position of the imaging channel to be focused by using the minimal rotation interval of the stepper motor, until a more precise clear focusing position is obtained.

Another aspect of the present application provides a fast focusing device for multi-spectral imaging, which comprising:

a camera configured to capture images, wherein the camera including an image analysis apparatus installed therein;

an optical lens configured to adjust an imaging focal length;

a stepper motor configured to drive the optical lens to rotate, wherein the stepper motor transmittingly connected with the optical lens by a conveyer belt;

a filter wheel provided with a plurality of optical filters arranged in a circle, wherein an optical axis of the optical lens being perpendicular to a plane where the filter wheel is positioned and being aligned with a center of a plane where the optical filters are positioned;

wherein, one of the optical filters of the filter wheel is rotated to be coaxial with the optical lens and the camera and form a reference channel; the stepper motor drives the optical lens to rotate; the image analysis apparatus calculates focus measures corresponding to all rotation positions of the stepper motor, and obtains a first distribution curve that represents a change of the focus measure of the reference channel along with the rotation position of the stepper motor;

the filter wheel is rotated to use the other filters to form imaging channels respectively, at least three rotation positions of the stepper motor are selected for each of the imaging channels, focus measures at the selected rotation positions are matched with the first distribution curve to obtain an offset value between the first distribution curve and a second distribution curve that represents the change of the focus measure of the imaging channel to be focused along with the rotation position of the stepper motor, and a clear focusing position of the imaging channel to be focused is calculated according to the offset value;

a fine-tuning focusing operation centering on the calculated clear focusing position by using a minimal rotation interval of the stepper motor is performed to obtain a precise clear focusing position.

Preferably, the stepper motor is provided with a focusing driving wheel, the optical lens is provided with a focusing driven wheel, and the focusing driving wheel is transmittingly connected with the focusing driven wheel by the conveyer belt.

When the fast focusing method and the fast focusing device for multi-spectral imaging provided by the present application are implemented, by using similarities of distribution curves that represent relations between focus measures of various spectral bands and rotational positions of stepper motors, fast focusing for multi-spectral imaging is achieved and clear spectral images are obtained. The focusing device provided by the present application uses this method to achieve fast multi-spectral focusing.

BRIEF DESCRIPTION OF THE DRAWINGS

FIG. 1 is a flow chart of a fast focusing method for multi-spectral imaging of the present application.

DETAILED DESCRIPTION OF THE PREFERRED EMBODIMENT

Figure 2A:
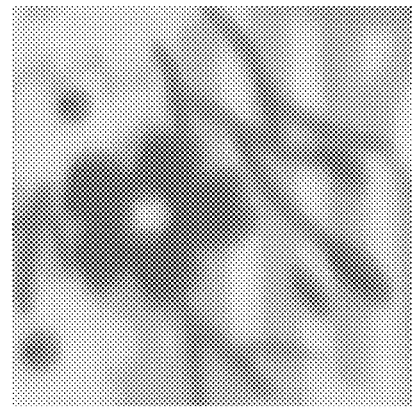
FIG. 2a is a multi-spectral image that is obtained without focusing.

In order to understand the technical features, purpose and the effect of the present invention more clearly, the preferred specific embodiments of the present invention will be described referring to the drawings.

FIG. 1 is a flow chart of a fast focusing method for multi-spectral imaging of the present application. The method particularly includes the following steps.

(1) Select a gray-level difference method as a focus measure evaluation criterion, and establish a focus measure evaluation function. In particular, the evaluation function is:

$$f = \sum_{x}\sum_{y} |I_x(x, y)| + |I_y(x, y)|$$

Wherein, (x, y) is a pixel coordinate of an image;

$$I_x(x, y) = I(x, y) * \begin{pmatrix} 1 & 2 & 1 \\ 0 & 0 & 0 \\ -1 & -2 & -1 \end{pmatrix}$$

$$I_y(x, y) = I(x, y) * \begin{pmatrix} 1 & 0 & -1 \\ 2 & 0 & -2 \\ 1 & 0 & -1 \end{pmatrix}$$

Wherein, I (x, y) is a grayscale value of the point (x, y) of the image, and * represents convolution. The greater the value of the focus measure evaluation function, the clearer the image.

(2) Select a reference channel. In this embodiment, a first channel is selected as the reference channel. In the reference channel, coarse-tuning focusing with an interval of $\text{int}(\sqrt{R})$ is performed in a rotation range 0~R of a stepper motor. Thus, fine-tuning focusing with a minimal rotation interval of the stepper motor is performed in a range centering on a clear focusing position obtained by the coarse-tuning focusing and having a radius of $\text{int}(\sqrt{R})$, and then a rotation position of the stepper motor corresponding to the clearest target image is obtained.

(3) Calculate focus measures of the reference channel corresponding to all rotation positions of the stepper motor by a cubic spline interpolation method, and thereby obtain a first distribution curve that represents the change of the focus measure of the reference channel along with the rotation position of the stepper motor.

(4) In each of the other channels, select four equidistant positions in the rotation range of the stepper motor:

$$k_i = \text{int}\left(\frac{iR}{4}\right), i = 0, 1, 2, 3;$$

Calculating errors:

$$e = \sum_{j=1}^{N} |\eta f_c(k_i) - f_b(k_i + d)|^2;$$

$$\eta = X^{-1}Y;$$

$$X = \begin{pmatrix} f_c(k_0) \\ f_c(k_1) \\ f_c(k_2) \\ f_c(k_3) \end{pmatrix};$$

$$Y = \begin{pmatrix} f_b(k_0 + d) \\ f_b(k_1 + d) \\ f_b(k_2 + d) \\ f_b(k_3 + d) \end{pmatrix};$$

Wherein, R is the rotation range of the stepper motor, $X^{-1}$ is the pseudo inverse of X, $f_c(k_i)$ is a focus measure of a channel to be focused at a position $k_i$, $f_b(k_i+d)$ is a focus measure of the reference channel at a position $k_i+d$, e is a matching error, and d is an offset value between the first distribution curve that represents the change of the focus measure of the reference channel along with the rotation position of the stepper motor and a second distribution curve that represents the change of the focus measure of a channel to be focused along with the rotation position of the stepper motor. Various values of d are selected and used to calculate the matching error e between the first distribution curve and the second distribution curve respectively. When the value of e is the minimum thereof, a corresponding value of d is considered as the offset value between the first distribution curve and the second distribution curve.

In this embodiment, sixteen channels are provided. One of the sixteen channels is the reference channel, therefore, the deviation calculation needs to be performed fifteen times.

(5) Estimate a clear focusing position of the channel to be focused by this formula: D(c)=D(1)+d(c). In this formula, D(c) represents the clear focusing position of a channel c to be focused. D(1) represents the clear focusing position of the first channel (i.e., the reference channel). d(c) represents the offset value between the first distribution curve and a c-th second distribution curve.

(6) In a range centering on the clear focusing position obtained by estimation and having a radius that equals eight times of the minimum rotation interval of the stepper motor (the value of the radius is obtained by a larger number of experiments), a fine-tuning focusing with the minimum rotation interval of the stepper motor is performed, and a clear focusing position for a target object is obtained.

Figure 2B:
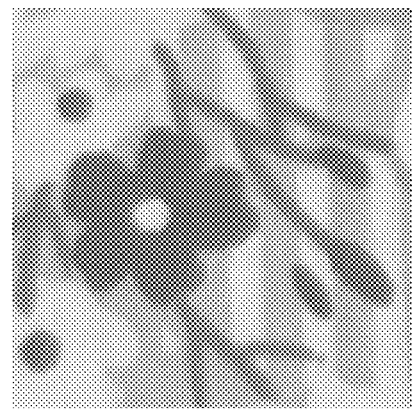
FIG. 2b is a multi-spectral image that is obtained by the fast focusing method of the present application.

When focusing is completed, the target object is imaged, as shown in FIG. 2(b). In comparison, a not focused image is shown in FIG. 2(a).

Table 1 lists the number of focusing positions required by a conventional method for automatically focusing a multi-spectral imaging system with sixteen channels, and the number of focusing positions required by the method of the present application for automatically focusing the multi-spectral imaging system with sixteen channels. In both the conventional method and the method of the present application, a rotation focusing range R of the stepper motor is 200.

In the conventional method, a coarse-tuning focusing step length r of each channel is calculated as $r=\text{int}(\sqrt{R})=14$. The number of focusing positions required by coarse-tuning focusing is calculated as int(R/r)=14. The number of focusing positions required by fine-tuning focusing equals the coarse-tuning focusing step length r. Therefore, the number $N_c$ of focusing positions required by each channel is 28, and all of the sixteen channels require 448 focusing positions in total.

In the method of the present application, the number $N_b$ of focusing positions required by the reference channel is 28, which equals that of the conventional method. However, each of the other channels requires only four focusing positions for matching. Furthermore, the number of rotation times of the stepper motor for fine-tuning focusing is eight, that is, each of the other channels requires only eight focusing positions for fine-tuning focusing. Therefore, except the reference channel, the number $N_c$ of focusing positions required by each of the other channels is 12, and all of the sixteen channels require 208 focusing positions in total.

It can be seen from Table 1 that the focusing positions required by the method of the present application is much less than the focusing positions required by the conventional method. Therefore, the method of the present application has higher efficiency.

TABLE 1

The numbers of focusing positions required by different methods

| Adopted method | The number of focusing positions of the stepper motor |
| --- | --- |
| Conventional method | 448 |
| Method of the present application | 208 |
| Percentage of efficiency increment | 57% |

Figure 3:
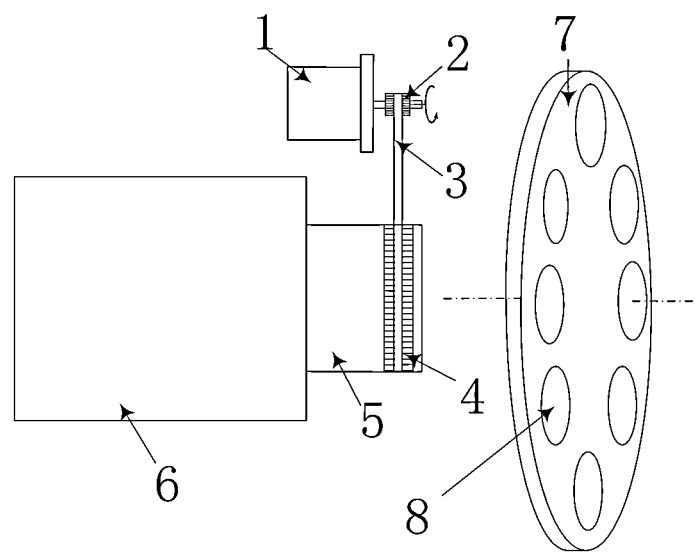
FIG. 3 is a schematic view of a fast focusing device for multi-spectral imaging of the present application.

FIG. 3 is a schematic view of a fast focusing device for multi-spectral imaging of the present application. In which, A focusing driving wheel 2 is fixed on a rotation shaft of a stepper motor 1, a focusing driven wheel 4 is fixed on a focusing ring of an optical lens 5, a conveyer belt 3 drives the focusing driven wheel 4 to rotate along with the focusing driving wheel 2, and the optical lens 5 is connected to a camera 6.

A filter wheel 7 includes various optical filters 8 which divide spectrum into different spectral bands. Each of the spectral bands corresponds to one imaging channel. The stepper motor 1 drives the focusing driving wheel 2 to rotate, and further drives the focusing driven wheel 4 via the conveyer belt 3. The focusing driven wheel 4 drives the focusing ring of the optical lens 5 to rotate, and thereby adjusts a distance between a lens group of the optical lens 5 and the camera 6. In this way, an image distance of each channel can be adjusted, and thus the channel is focused by changing the image distance.

In a particular focusing process, one of the optical filters 8 is selected to establish a reference channel, and rotation position of the stepper motor 1 is adjusted by the aforementioned coarse-tuning focusing method and fine-tuning focusing method. A focus measure corresponding to a desired rotation position of the stepper motor 1 is further calculated, and a first distribution curve that represents the change of the focus measure of the reference channel along with the rotation position of the stepper motor 1 is thereby obtained. The calculation process can be performed by an image analysis apparatus installed inside the camera 6.

Afterwards, the selected filter is rotated, and other imaging channels are processed. In each of the other imaging channels, at least three rotation positions of the stepper motor 1 are selected, and focus measures at the selected rotation positions are matched with the first distribution curve to obtain an offset value between the first distribution curve and a second distribution curve that represents the change of the focus measure of the channel to be focused along with the rotation position of the stepper motor 1. The image analysis apparatus calculates a clear focusing position of the channel to be focused according to the offset value.

Finally, a fine-tuning focusing operation centering on the calculated clear focusing position by a minimal rotation interval of the stepper motor 1 is performed. In this way, a precise clear focusing position is found near the center point of the fine-tuning focusing operation.

While the present invention has been described with the drawings to preferred embodiments which is merely a hint rather than a limit, it will be understood by those skilled in the art that various changes may be made and equivalents may be substituted without departing from the scope of the present invention. But all the changes will be included within the scope of the appended claims.

What is claimed is:

1. A fast focusing method for multi-spectral imaging comprising following steps:
    S1, selecting one of a plurality of imaging channels as a reference channel, adjusting rotation positions of a stepper motor, calculating focus measures corresponding to all rotation positions of the stepper motor, and obtaining a first distribution curve that represents a change of the focus measure of the reference channel along with the rotation position of the stepper motor;
    S2, for each of the other imaging channels, selecting at least three rotation positions of the stepper motor, matching focus measures at the selected rotation positions with the first distribution curve to obtain a second distribution curve that represents a change of the focus measure of the imaging channel to be focused along with the rotation position of the stepper motor and an offset value between the first distribution curve and the second distribution curve, and calculating a clear focusing position of the imaging channel to be focused according to the offset value;
    S3, performing a fine-tuning focusing operation centering on the calculated clear focusing position by using a minimal rotation interval of the stepper motor, and thereby obtaining a precise clear focusing position.

2. The fast focusing method for multi-spectral imaging according to claim 1, wherein, in the step S1, the focus measures are calculated by a gray-level difference method.

3. The fast focusing method for multi-spectral imaging according to claim 1, wherein, in the step S1, the first distribution curve is obtained by an interpolation method.

4. The fast focusing method for multi-spectral imaging according to claim 1, wherein, in the step S2, the selected rotation positions of the stepper motor are distributed throughout a whole focusing range.

5. The fast focusing method for multi-spectral imaging according to claim 1, wherein, in the step S2, the offset value is calculated using a similarity between distribution curves of different imaging channels.

6. The fast focusing method for multi-spectral imaging according to claim 1, wherein, in the step S3, the fine-tuning focusing operation is performed in a preset range centering on the calculated clear focusing position of the imaging channel to be focused by using the minimal interval of the stepper motor.

7. A fast focusing device for multi-spectral imaging, comprising:
    a camera configured to capture images, wherein the camera including an image analysis apparatus installed therein;
    an optical lens configured to adjust an imaging focal length;
    a stepper motor configured to drive the optical lens to rotate, wherein the stepper motor transmittingly connected with the optical lens by a conveyer belt;
    a filter wheel provided with a plurality of optical filters arranged in a circle, wherein an optical axis of the optical lens being perpendicular to a plane where the filter wheel is positioned and being aligned with a center of a plane where the filters are positioned;
    wherein, one of the filters of the filter wheel is rotated to be coaxial with the optical lens and the camera and form a reference channel; the stepper motor drives the optical lens to rotate; the image analysis apparatus calculates focus measures corresponding to all rotation positions of the stepper motor, and obtains a first distribution curve that represents a change of the focus measure of the reference channel along with the rotation position of the stepper motor;
    the filter wheel is rotated to use the other filters to form imaging channels respectively, at least three rotation positions of the stepper motor are selected for each of the imaging channels, focus measures at the selected rotation positions are matched with the first distribution curve to obtain an offset value between the first distribution curve and a second distribution curve that represents the change of the focus measure of the imaging channel to be focused along with the rotation position of the stepper motor, and a clear focusing position of the imaging channel to be focused is calculated according to the offset value;
    a fine-tuning focusing operation centering on the calculated clear focusing position by using a minimal rotation interval of the stepper motor is performed to obtain a precise clear focusing position.

8. The fast focusing device for multi-spectral according to claim 7, wherein, the stepper motor is provided with a focusing driving wheel, the optical lens is provided with a focusing driven wheel, and the focusing driving wheel is transmittingly connected with the focusing driven wheel by the conveyer belt.

\* \* \* \* \*